United States Patent [19]

Lazzari

[11] Patent Number: 4,978,253

[45] Date of Patent: Dec. 18, 1990

[54] AIR CUSHION CONVEYING DEVICE WITH MAGNETIC GUIDANCE

[75] Inventor: Jean-Pierre Lazzari, Corenc, France

[73] Assignee: Commissariat a l'Energie Atomique, Paris, France

[21] Appl. No.: 360,251

[22] Filed: Jun. 2, 1989

[30] Foreign Application Priority Data

Jun. 8, 1988 [FR] France .................. 88 07636

[51] Int. Cl.$^5$ .............................................. B65G 51/03
[52] U.S. Cl. ........................................ 406/88; 406/86; 406/87
[58] Field of Search .................... 406/86–88, 406/184; 198/619

[56] References Cited

U.S. PATENT DOCUMENTS

| | | | |
|---|---|---|---|
| 3,610,695 | 10/1971 | Yabuta | 198/619 |
| 4,714,155 | 12/1987 | Watanabe | 198/619 |
| 4,718,539 | 1/1988 | Fukuwatari et al. | 198/619 |
| 4,865,491 | 9/1989 | Sakurai | 406/88 X |

FOREIGN PATENT DOCUMENTS

| | | | |
|---|---|---|---|
| 003584 | 9/1981 | European Pat. Off. | |
| 2133757 | 8/1984 | United Kingdom | |
| 52149 | 3/1982 | Japan | 198/619 |
| 150923 | 7/1986 | Japan | 406/87 |
| 150925 | 7/1986 | Japan | 406/87 |
| 100319 | 5/1987 | Japan | 406/88 |
| 87428 | 3/1989 | Japan | 198/619 |

OTHER PUBLICATIONS

Patent Abstract of Japan, vol. 8, No. 29 (M-356) p. 752 Feb. 7, 1985.
IBM Technical Disclosure, Bulletin vol. 18, No. 9 Feb. 1976.

Primary Examiner—Joseph F. Peters, Jr.
Assistant Examiner—James M. Kannofsky
Attorney, Agent, or Firm—Pearne, Gordon, McCoy & Granger

[57] ABSTRACT

Device for conveying on an air cushion with magnetic guidance having a track (12) provided with air jet pipes issuing obliquely in one longitudinal direction onto its upper face, permitting the longitudinal displacement of a disk (30) without contact with the track (12). The track supports a first magnetic guidance device (34) running on its upper face. The face facing the track (12) of disk (30) is provided with a second magnetic device facing the first magnetic guidance device (34). The device is applied to the conveying of silicon wafers in an ultra-clean environment.

7 Claims, 2 Drawing Sheets

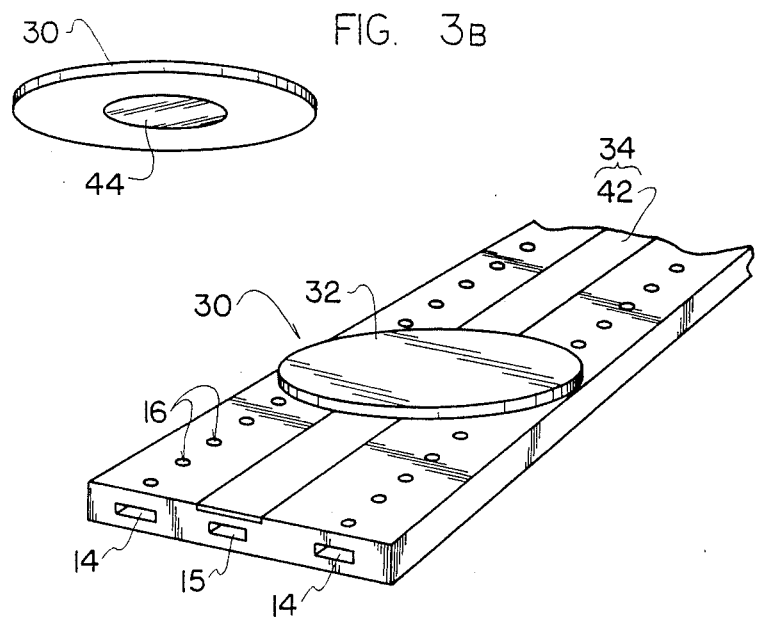
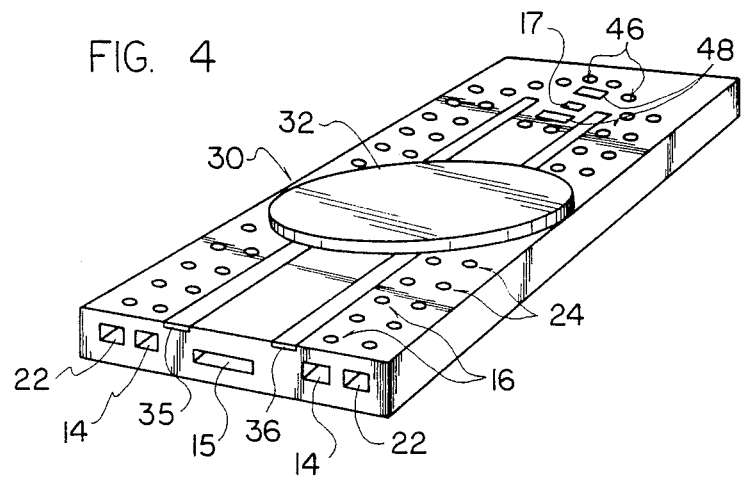

AIR CUSHION CONVEYING DEVICE WITH MAGNETIC GUIDANCE

DESCRIPTION

BACKGROUND OF THE INVENTION

The present invention relates to an air cushion conveying device with magnetic guidance. It more particularly applies to the conveying of silicon wafers in an ultra-clean environment.

Silicon wafers are loaded into cassettes. The displacement of these wafers during the transfer between cassettes or between a cassette and a processing machine (etching, deposition, etc.) must be carried out in such a way that polluting dust is avoided to the greatest possible extent.

Various means are used for the conveying operation. A first system consists of two cylindrical, parallel belts, each guided by two rollers or pulleys. The rotation of the latter makes it possible to convey a wafer located on the belts. However, the said system suffers from the disadvantage that the belts give off particles produced by their rubbing against the rollers. The particles can stick to the silicon wafers and pollute them.

A second known system consists of an articulated arm provided with a "sucker" finger. The wafer to be conveyed is kept by suction on the "sucker" finger. This device causes little pollution, but only permits short-distance paths and is expensive.

Compared with the first two systems, preference is generally given to the known system of levitation on an air cushion. Such a system is diagrammatically shown in FIG. 1. A silicon wafer 10 is carried and moved by an air cushion above a track 12. The latter has two longitudinal, parallel pipes 14 issuing obliquely through orifices 16 on its upper face facing the wafer 10. Pressurized air is blown by a not shown blower system into the pipes 14, so as to pass out again through the orifices 16 as oblique jets.

However, the latter device still suffers from disadvantages. If the wafer 10 is not guided, it can pass out of the track 12. To avoid this, lateral guides 18 are added on either side of the track 12.

However, in order to be guided, every so often the wafer strikes a lateral guide 18, so that polluting particles are released. The moving wafer has a certain kinetic energy. In order to stop it, use is made of a system of abutments 20 located at the end of the track 12 which are associated with a vacuum system which, by suction, fixes the wafer 10 to track 12. The vacuum system consists of a pipe 15 arranged longitudinally in track 12 and issuing onto the latter through an orifice 17. Pipe 15 is connected to a not shown suction system. During the stopping by abutments 20, as hereinbefore described, the impact produces polluting particles. The jets discharged through the orifices 16 form a powerful air flow to the rear of wafer 10, which sometimes disengages particles. These particles can then be stuck to the wafer. This phenomenon destroys the surface state of the wafer.

SUMMARY OF THE INVENTION

The present invention aims at obviating these disadvantages. For this purpose, it recommends the use of a plate or disk supporting the wafer. On the track and on the disk are arranged facing magnetic devices, which mutually attract. These magnetic devices permit the guidance of the disk above the track. Thus, there is no longer any need to use lateral guides 18. The use of a disk avoids direct contact between the air jets and the wafer and therefore prevents particles being torn from the wafer. Finally, at the end of the track, an arrangement of the magnetic device coupled to a circular arrangement of the orifices 16 supplying the air jets, enables the disk to rotate on itself. This rotation causes the stoppage of the translation of the disk. Therefore, there is no longer any need for the abutments 20.

More specifically, the present invention relates to a device for conveying a part on an air cushion with magnetic guidance incorporating a track having an upper face, said track having air jet pipes issuing obliquely in a first longitudinal direction on its upper face, thus making it possible to longitudinally displace the part without contact with the track, characterized in that the device comprises a circular disk, which can rotate and support said part, the track is provided with a first magnetic guidance device constituted by at least one magnetized strip running on its upper face and the disk is provided on its face facing the track with a second magnetic device having a symmetry of revolution facing the first magnetic guidance device.

The magnetic attraction between the two magnetic devices makes it possible to guide the disk above the track during displacements of the disk.

In a first preferred embodiment, the first magnetic guidance device consists of two parallel, magnetized strips inserted in the upper face of the track.

The second magnetic device placed on the disk can then be constituted by a magnetic sheet ring inserted in the disk and whose diameter is at least equal to the spacing between the parallel, magnetized strips.

For a satisfactory operation of the device according to the invention, the magnetic lines emanating from the magnetic strips must then close on the magnetic sheet ring positioned on the disk.

In a second embodiment, the first magnetic guidance device consists of a longitudinal, magnetized strip inserted in the center of the upper face of the track.

The second magnetic device then consists of a magnetic sheet ring inserted in the plate, said ring having a diameter substantially equal to the width of the magnetized strip inserted in the center of the upper face of the track.

According to secondary feature, at the end of the track, the air jets are arranged in the form of a circle, so that the disk arriving above these jets is rotated. This phenomenon, linked with the positioning of supplementary magnets on the track, permits the shock-free stoppage of the disk.

The second magnetic device can be made from a random magnetic material, which can be attracted by the first magnetic device. Preference is given to the use of Mumetal.

According to a secondary feature, the track has air jet pipes issuing obliquely in a second longitudinal direction on its upper face.

Thus, the disk can be moved in both longitudinal directions of the track and can be stopped at the end of the track without striking any wall. Moreover, the air jets are not in direct contact with the transported object, so that the disk also protects against the action of the air jets.

BRIEF DESCRIPTION OF THE DRAWINGS

The invention is described in greater detail hereinafter relative to non-limitative embodiments and the attached drawings, wherein show:

FIG. 3A is a perspective view diagrammatically showing a second embodiment of a device according to the invention.

FIG. 3B is a perspective view diagrammatically showing the lower face of the disk supporting the second magnetic device in the embodiment of FIG. 3A.

FIG. 4 is a perspective view diagrammatically showing one end of the track of a device according to the invention.

DETAILED DESCRIPTION OF THE PREFERRED EMBODIMENT

Figure 1:
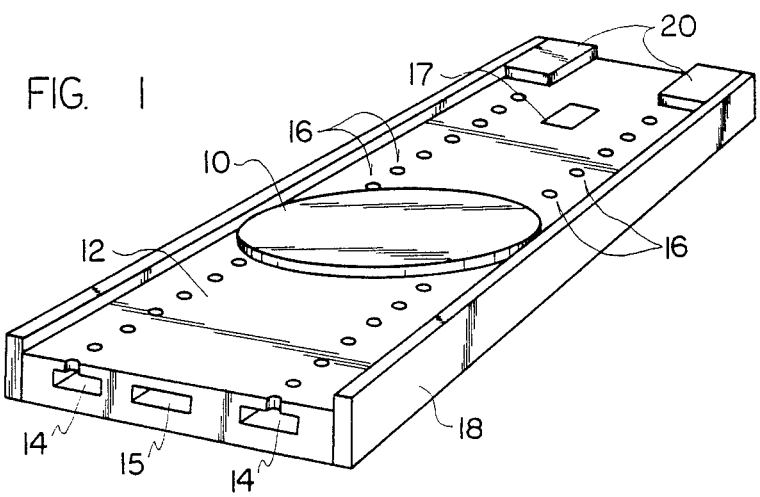
FIG. 1 is a perspective view diagrammatically showing an air cushion conveying device already described and relating to the prior art.
Figure 2C:
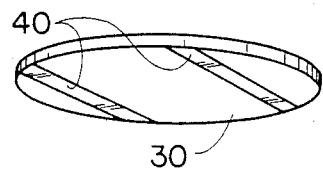
FIG. 2C is a perspective view diagrammatically showing another embodiment of the second magnetic device placed on the lower face of the disk in the embodiment of FIG. 2A.
Figure 2B:
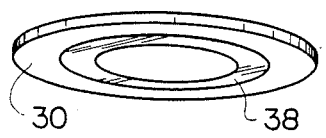
FIG. 2B is a perspective view diagrammatically showing an embodiment of the second magnetic device placed on the lower face of the disk in the embodiment of FIG. 2A.
Figure 2A:
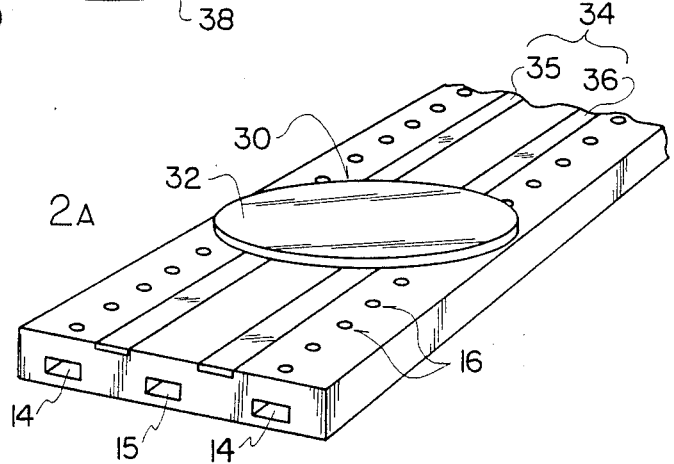
FIG. 2A is a perspective view diagrammatically showing a first embodiment of a device according to the invention.

FIGS. 2A-2C diagrammatically illustrate a first embodiment of a device according to the invention. FIG. 2A shows that the device has a track 12 made from a solid material (e.g. a plastics material or aluminium) or a composite material (e.g. sandwich of plastics material between two aluminium plates). This track, which can be linear or inwardly curved, has an upper planar face constituting the actual track. The track 12 has two longitudinal, parallel pipes 14 issuing by orifices 16 on its upper face. The orifices 16 are all obliquely oriented in the same longitudinal direction with respect to the track and are arranged in two parallel rows located symmetrically with respect to the center of the track. Pressurized air is blown into these pipes 14 from a not shown source, so as to pass out again through orifices 16 as oblique jets.

A nonmagnetic material disk 30 (e.g. silicon, aluminium or plastic) is carried and moved on the air cushion formed by the jets. Disk 30, which is the form of a flat disk, makes it possible to convey e.g. silicon wafers. A wafer is then simply placed on the upper face of disk 30, which is advantageously covered with an nonmagnetic, non-slip coating 32, e.g. of polymer, preventing any slipping of the wafer (said upper face need merely be rough). For use in the transportation of silicon wafers, the disk 30 must have a diameter smaller than that of the wafer. At the end of travel, the wafer can easily be removed by the edges projecting beyond disk 30.

Disk 30 is guided on track 12 by a first magnetic guidance device 34 placed on said track facing a second magnetic device placed on the lower face of disk 30. The first magnetic guidance device 34 comprises, in a first embodiment of the invention, two magnetic strips 35, 36 inserted in two longitudinal, parallel channels formed on the upper face of track 12 and symmetrically with respect to the center of the latter. These strips 35, 36, which are of adhesive Ferriflex (ferrite agglomerated on plastic or Mumetal strip) can e.g. have a width of 1 cm and can e.g. have a spacing of 2 to 3 cm.

FIGS. 2B and 2C show two embodiments of the second magnetic device placed on disk 30. It can be seen that the lower face of disk 30 is facing the track.

In a first variant (FIG. 2B), the second magnetic device is constituted by a magnetic sheet ring 38 (e.g. of Mumetal). Ring 38 is inserted in the lower face of disk 30 in the form of a sheet with a thickness of e.g. 200 to 500 micrometers. The diameter of ring 38 is at least equal to the spacing between the magnetic strips 35, 36. Preferably, the width of the ring is equal to the width of the magnetic strips 35, 36 and the mean diameter of ring 38 is substantially equal to the spacing between the strips.

The thus formed device has the maximum stability during travel. The air jets raise and move the disk 30 and by their attraction, the magnetic devices guide disk 30.

FIG. 2C shows another embodiment of the second magnetic device. The latter is constituted by two parallel strips 40, e.g. of Mumetal, which are arranged symmetrically with respect to the center of disk 30. Strips 40 preferably have the same width and spacing as magnetic strips 35, 36. The latter serve as rails on which can be aligned the strips 40 of disk 30.

The insertion of the first and second magnetic devices in track 12 and disk 30 is realized in such a way as to respect the plane of the facing faces of track 12 and disk 30.

FIGS. 3A and 3B diagrammatically illustrate a second embodiment of the invention. FIG. 3A shows that in this case the first magnetic device 34 is constituted by a single magnetized strip 42 inserted in a longitudinal channel made in the centre of the upper face of track 12.

FIG. 3B shows the lower face of disk 30 supporting the second magnetic device. The latter is constituted by an e.g. Mumetal ring 44, which is inserted in a slot in the center of the lower face of disk 30, while respecting the plane of the face of the latter. During the displacement of disk 30 above track 12, ring 44 is located facing strip 42.

FIG. 4 diagrammatically shows one end of the track of a device according to the invention. In this case, the track 12 is traversed by two supplementary longitudinal, parallel pipes 22 issuing by orifices 24 onto the upper face of track 12. Orifices 24 are obliquely inclined in a direction opposite to orifices 16 and are arranged in two aligned rows symmetrical with respect to the center of the track and slightly displaced with respect to the orifices 16. Pressurized air blown into the pipes 22 permits a displacement of disk 30 in the direction opposite to that induced by the oblique jets from orifices 16. Thus, the device shown in FIG. 4 permits a displacement of disk 30 in the two longitudinal directions of track 12.

At the end of the track, at least one of the pipes 14 issues onto the upper face of track 12 by orifices 46 arranged in the form of a circle, whose center is located in the middle of the track. The orifices 46 are made obliquely, so that oriented air jets rotate disk 30. This rotation, linked with a travel stability of disk 30, increased by the addition of two magnetized inserts 48 aligned with the center of track 12, brings about the stoppage of disk 30. The latter is then maintained on track 12 by the suction action of a conventional vacuum system incorporating a longitudinal suction pipe 15 formed in the track 12 and issuing onto the upper face of the latter through an orifice 17 located in the center of the circle formed by the orifices 46.

Thus, a device according to the invention permits the transportation of objects on a disk, which can optionally move in two longitudinal directions of the track. As a result of the magnetic guidance system, the track can follow any configuration, bends, rises and falls being allowed. The impacts which generate polluting particles due to the guidance and stoppage by guides and abutments are consequently obviated, which ensures an ultra-clean environment.

I claim:

1. Air cushion conveying device with magnetic guidance incorporating a track, having an upper face, said track having air jet pipes issuing obliquely in a first longitudinal direction on its upper face, thus making it possible to longitudinally displace a part without contact with the track, this device comprises a circular disk, which can rotate and support said part, the track is provided with a first magnetic guidance device constituted by two parallel, magnetized strips inserted in the upper face of said track and the disk is provided on its face facing the track with a second magnetic device constituted by a magnetic sheet ring inserted in said disk and whose diameter is at least equal to the spacing between the parallel, magnetized strips.

2. Air cushion conveying device with magnetic guidance according to claim 1, wherein at the end of the track, at least one of the pipes issues onto the upper face of said track through orifices arranged in a circular manner, so that the disk is rotated by air jets discharged through said orifices.

3. Air cushion conveying device with magnetic guidance, according to claim 2, wherein at least one supplementary permanent magnet is inserted at the end of the track.

4. Air cushion conveying device with magnetic guidance incorporating a track having an upper face, said track having air jet pipes issuing obliquely in a first longitudinal direction on its upper face, thus making it possible to longitudinally displace a part without contact with the track, this device comprises a circular disk which can rotate and support said part, the track is provided with a first magnetic guidance device constituted by a longitudinal, magnetized strip inserted in the center of the upper face of the track and the disk is provided on its face facing the track with a second magnetic device having a symmetry of revolution facing the first magnetic guidance device.

5. Air cushion conveying device with magnetic guidance according to claim 4, wherein the second magnetic device comprises a magnetic sheet ring inserted in the disk and said ring has a diameter substantially equal to the width of the magnetized strip inserted in the center of the upper face of said track.

6. Air cushion conveying device with magnetic guidance according to claim 4, wherein at the end of the track, at least one of the pipes issues onto the upper face of said track through orifices arranged in a circular manner, so that the disk is rotated by air jets discharged through said orifices.

7. Air cushion conveying device with magnetic guidance, according to claim 6, wherein at least one supplementary permanent magnet is inserted at the end of the track.

* * * * *